(12) United States Patent
Cole et al.

(10) Patent No.: US 7,529,154 B2
(45) Date of Patent: May 5, 2009

(54) HYBRID THIN FILM HETEROSTRUCTURE MODULAR VIBRATION CONTROL APPARATUS AND METHODS FOR FABRICATION THEREOF

(75) Inventors: Melanie W. Cole, Churchville, MD (US); William Nothwang, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/905,364

(22) Filed: Sep. 28, 2007

(65) Prior Publication Data

US 2009/0085437 A1 Apr. 2, 2009

(51) Int. Cl.
*H04R 7/26* (2006.01)
(52) U.S. Cl. .................. 367/162; 310/326; 367/157
(58) Field of Classification Search .................. 310/326
See application file for complete search history.

(56) References Cited

U.S. PATENT DOCUMENTS

| | | | |
|---|---|---|---|
| 4,565,940 A | 1/1986 | Hubbard, Jr. | |
| 4,626,730 A | 12/1986 | Hubbard, Jr. | |
| 4,627,159 A | 12/1986 | Waldner | |
| 5,005,678 A | 4/1991 | Julien et al. | |
| 5,052,529 A | 10/1991 | Sutcliffe et al. | |
| 5,328,141 A | 7/1994 | Dickinson | |
| 5,485,053 A | 1/1996 | Baz | |
| 5,565,380 A | 10/1996 | Nemoto et al. | |
| 5,656,846 A | 8/1997 | Yamada | |
| 5,750,272 A * | 5/1998 | Jardine | 428/686 |
| 5,786,621 A | 7/1998 | Saif et al. | |
| H1762 H | 12/1998 | Kaempf et al. | |
| 6,116,389 A | 9/2000 | Allaei | |
| 6,157,101 A | 12/2000 | Ullakko et al. | |
| 6,354,576 B1 | 3/2002 | Jacobs et al. | |
| 6,394,242 B1 | 5/2002 | Allaei | |
| 6,439,447 B1 | 8/2002 | Minamitani et al. | |
| 6,514,835 B1 | 2/2003 | Hendrix et al. | |
| 6,598,717 B1 | 7/2003 | Wang et al. | |
| 6,666,108 B1 | 12/2003 | Alleai | |
| 6,708,962 B2 | 3/2004 | Allaei | |
| 6,871,565 B2 | 3/2005 | Allaei | |
| 6,920,794 B2 | 7/2005 | Luo et al. | |
| 6,935,206 B2 | 8/2005 | Alleai | |
| 6,992,321 B2 * | 1/2006 | Tungare et al. | 257/40 |
| 7,114,711 B2 | 10/2006 | Allaei | |
| 7,131,640 B2 | 11/2006 | Knowles et al. | |
| 2003/0006417 A1 * | 1/2003 | Klosowiak et al. | 257/79 |

* cited by examiner

*Primary Examiner*—Thomas M Dougherty
*Assistant Examiner*—Bryan P Gordon
(74) *Attorney, Agent, or Firm*—Edward L. Stolarun; Christos S. Kyriakou

(57) ABSTRACT

Microelectromechanical systems (MEMS) include critical devices for various highly sensitive applications. However, MEMS operation may be impaired by vibration. A modular vibration control pedestal for integration with a MEMS is provided according to embodiments of the present invention which includes a piezoelectric perovskite oxide disposed on a substrate and a shape memory alloy component component disposed on the piezoelectric perovskite oxide. In particular embodiments of a MEMS device including a modular VCP, vibration is reduced by at least 50%.

20 Claims, 5 Drawing Sheets

HYBRID THIN FILM HETEROSTRUCTURE MODULAR VIBRATION CONTROL APPARATUS AND METHODS FOR FABRICATION THEREOF

GOVERNMENT INTEREST

The invention described herein may be manufactured, used, and licensed by or for the United States Government.

FIELD OF THE INVENTION

This invention relates generally to apparatus for vibration damping, and more specifically to apparatus for vibration damping in MEMS devices.

BACKGROUND OF THE INVENTION

Microelectromechanical systems (MEMS) are critical devices for various highly sensitive applications. For example, MEMS include navigation and guidance control devices for advanced smart munitions/missile systems. However, the development and potential fielding of these next generation smart systems is currently impeded by the inability to satisfy the stringent performance standards for the precision and control of their "target-hit interactions". These advanced smart systems currently suffer from severe inaccuracies caused by a critical failure of a MEMS inertial measurement unit (IMU), i.e., the angular rate sensor (ARS). This IMU failure is caused by its susceptibility to a harsh extrinsic vibration environment. This environment, generated from launch, high-G, and/or in-flight vibration forces, causes an out-of-plane motion or false angular rate signal to be generated. Specifically, inertial MEMS devices work by deriving positional information from measured acceleration and time. Acceleration sensors typically employ minute cantilevered rest masses mechanically resonating in a given plane. The angular rate sensors required for these smart systems work by measuring the relative motion of a resonating beam out from the plane of resonance (resonant frequency ranging from 8 kHz to 25 kHz). The Coriolis acceleration has to be accounted for any moving body in a rotating reference frame, i.e., the earth. This motion is proportional to the angular rotation of the device and is sensed with respect to the package. The derived positional information is therefore dependent on the accuracy of such input data. An out-of-plane motion (therefore, an angular rate) that is generated by erroneous vibrations at or near the resonant frequency of the beam structure will give false angular signals, causing decreased accuracy of the target-hit interactions. Clearly, vibration damping of the MEMS-ARS is needed for successful guidance and navigational control of propellant and/or gun launched projectiles.

Thus, there is a continuing need for vibration damping apparatus, particularly in MEMS devices, as well as methods for fabrication of vibration damping devices.

SUMMARY OF THE INVENTION

A modular vibration control pedestal is provided according to the present invention which includes a piezoelectric perovskite oxide disposed on a substrate and a shape memory alloy component component disposed on the piezoelectric perovskite oxide. In specific embodiments, the shape memory alloy component is in the form of a thin film having a thickness in the range of about 10 nm-100 microns, inclusive. In further specific embodiments, the piezoelectric perovskite oxide component is in the form of a thin film having a thickness in the range of about 10 nm-1000 nm, inclusive.

Generally, both the shape memory alloy component and the piezoelectric perovskite oxide component have a longest dimension generally parallel to the substrate and a thickness generally perpendicular to the substrate, the longest dimension greater than the thickness.

A modular vibration control pedestal is provided in specific embodiments which is integrated with a MEMS device. In a particular example, of a modular vibration control pedestal according to the present invention is integrated with a MEMS angular rate sensor.

In preferred embodiments, a modular vibration control pedestal reduces vibration passing through the substrate, the piezoelectric perovskite oxide and the shape memory alloy component by about 50-100%. In further preferred embodiments, an inventive vibration control pedestal is effective to damp mechanical vibrations having frequencies in the range of about 3 kHz to about 25 kHz with an elastic dissipation value of at least 0.5.

Optionally, one or more adhesion/buffer components is disposed between the substrate and the piezoelectric perovskite oxide component.

A method of fabricating a vibration control pedestal module is provided according to embodiments of the present invention which includes depositing a piezoelectric perovskite oxide on a substrate and crystallizing the perovskite oxide. Embodiments of an inventive method further includes depositing a shape memory alloy on the piezoelectric perovskite oxide; and crystallizing the shape memory alloy. One or more adhesion/buffer components is disposed on the substrate.

DETAILED DESCRIPTION OF THE INVENTION

A modular vibration control pedestal (VCP) is provided to mitigate the effect of vibrations on sensitive devices, such as micro-electromechanical systems (MEMS) devices.

A modular VCP includes a heterostructure composite bilayer including a shape memory alloy (SMA) component and a piezoelectric component, the bilayer supported on a substrate.

Figure 1:
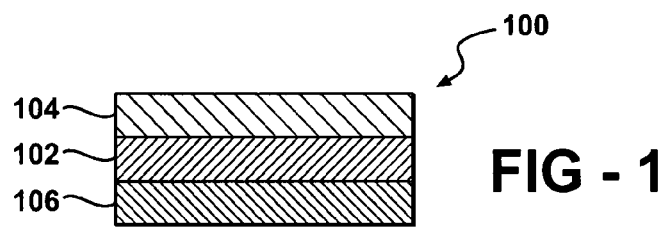
FIG. 1 is a schematic representation of an embodiment of a vibration control pedestal (VCP) according to the present invention.

FIG. 1 shows a modular VCP 100 including a heterostructure composite bilayer having a piezoelectric component 102 and a shape memory alloy component 104. The heterostructure composite bilayer is present on a substrate 106. A modular VCP according to an embodiment of the present invention provides passive damping including non-linear deformations produced when materials of a provided heterostructure composite bilayer component included in a VCP are mechanically loaded. The modular character of the VCP allows for integration of the VCP to damp vibration as the need for vibration damping arises. Thus, for example, a modular VCP is integrated into a device after fabrication or purchase of the device, such as where undesirable effects of vibration on device performance were unanticipated. It is appreciated that a modular VCP is usefully integrated into an aging device, for instance to damp vibration which had previously not affected performance of the device. Further, multiple modular VCPs may be used as needed. It is further appreciated that integration of a modular VCP according to the present invention requires few added process steps to production of a vibration damped device and adds little weight or size to a device when integrated therewith.

The disclosed VCP reduces undesirable extrinsic vibrations in MEMS scale devices. In particular embodiments of a MEMS device including a VCP, vibration is reduced by at least 50%.

A heterostructure composite bilayer component included in a VCP incorporates advantages of reversible processes taking place in the materials which absorb the energy when the material is mechanically loaded, particularly piezoelectric domain wall motion of the piezoelectric component and phase/twin boundary motion of the shape memory alloy component. Active materials such as piezoelectric and shape memory alloys absorb energy via internal domain wall motion. The hysteretic motion of the domain walls absorbs up to 80% of the incident energy (tan $\delta$=1.0).

For SMA the use of active materials utilizing twin boundary motion represents a revolutionary approach to absorb vibrations throughout a structure. Twin boundaries move in active materials (e.g., SMAs) when a sufficient pressure is applied. As the pressure increases sufficiently high to move the twins, it orients in the material with the loading direction. Upon removal of the load, residual stresses will tend to move the twin boundaries back toward their original location. However, the stress to move them back is at a lower level than the forward critical level. This stress reduction causes stress hysteresis in the stress strain curve. The magnitude of this hysteresis is a direct measure of the energy absorbed by the material in a given cycle. Therefore, when the material is cycled at specific load levels the twin boundaries move within the material and absorb energy. The twin boundaries find stable energy wells dependent upon the external pressure, temperature and field applied to the material. Thus, damping over large pressure ranges can be achieved with these SMA active materials utilizing twin boundary motion.

A modular VCP according to embodiments of the present invention includes materials having high mechanical dissipation factors and configurations of those materials selected to produce impedance mismatches at the interfaces of the materials.

An SMA material is a metal alloy having the property of reversible temperature dependent transformation known as martensitic transformation. Shape memory alloys illustratively include nickel-based alloys, copper-based alloys and iron-based alloys. For example, a copper-based alloy typically includes copper and at least one of zinc, aluminum, tin, manganese and nickel. An iron-based alloy typically includes iron and at least one of manganese, silicon, chromium, platinum and nickel. A nickel-based alloy typically includes at least one of titanium, niobium, aluminum, copper, palladium, zirconium and hafnium. A particular nickel based alloy is NiMgGa. Specific examples of copper-based alloys include copper-zinc, copper-aluminum, copper-tin, copper-zinc-aluminum, and copper-nickel-aluminum. Further exemplary shape memory alloys include silver-aluminum, gold-aluminum, silver-cadmium, gold-cadmium, indium-titanium, and nickel-aluminum.

A preferred shape memory alloy is a nickel-titanium (NiTi) alloy. In general, NiTi shape memory alloys include nickel in amounts in the range of about 45-55 atomic %, inclusive.

A shape memory alloy is preferably deposited as a thin film with nominal thickness in the range of about 10 nm-100 microns, more preferably about 1 micron-10 microns. In a specific example, a preferred shape memory alloy thin film is a nickel-titanium alloy layer having a thickness of about 10 microns.

Piezoelectric materials absorb energy through domain wall motion. Domain wall motion initiates at ~0.1% strain in piezoelectric ceramic materials. While the motion of piezoelectric domains occurs around 0.1% strain, it saturates at or around 0.7-1.0% strain, once again dependent upon composition.

A piezoelectric ceramic included in a VCP according to the present invention is a material that produces an electrical charge when deformed by compression, tension, vibration, acoustical energy, or other stressor. In addition, a piezoelectric ceramic deforms in response to application of an electrical charge.

In specific preferred embodiments, a piezoelectric ceramic included in a VCP according to the present invention is a perovskite oxide. An included piezoelectric perovskite ceramic includes metal oxides including metals illustratively including Ag, Al, Ba, Bi, Ta, Sr, Ca, Mn, Pb, Ti, Zr, Mg, La and Nb. A preferred piezoelectric perovskite oxide ceramic is $Ba_{1-x}Sr_xTiO_3$.

A heterostructure bilayer including a piezoelectric material and a shape memory alloy dampens out a broad spectrum of energy level present at different strain levels. For low level strains (less than 1%) the piezoelectric material absorbs the energy. For high level strains (greater than 1%) the shape memory alloy material absorbs the energy.

A piezoelectric perovskite oxide material is preferably deposited as a thin film with nominal thickness in the range of about 10 nm-1000 nm, more preferably about 50 nm-500 nm. In a specific example, a piezoelectric perovskite oxide thin film is a $Ba_{1-x}Sr_xTiO_3$ layer having a thickness of about 200 nm.

A suitable substrate supports a heterostructure bilayer and any bonding and/or buffer/adhesion layers. The substrate may have a composition, shape and size desirable for a particular application. For example, a suitable substrate includes a single crystal solid. In a preferred embodiment, a substrate included in a VCP includes a (100) silicon material. In a preferred embodiment, a substrate is a (100) silicon wafer.

The disclosed VCP preferably has a size commensurate with MEMS scale devices. In general, a VCP according to the present invention has a length and a width wherein the length and width are each independently in the range of about 1 micron to about 10 millimeters or more, inclusive. A VCP according to the present invention has a thickness in the range of about 200 nm to about 1000 microns, inclusive. In preferred embodiments, a VCP includes a piezoelectric perovskite oxide component and a SMA component wherein the thickness of each of the piezoelectric perovskite oxide component and the SMA component is less than the length and/or width of the individual piezoelectric perovskite oxide component or SMA component.

Individual components included in a heterostructure bilayer in a VCP according to the present invention are preferably included in the form of a thin film. In specific embodiments, the shape memory alloy component is in the form of a thin film having a thickness in the range of about 10 nm-100 microns, inclusive. In further specific embodiments, the piezoelectric perovskite oxide component is in the form of a thin film having a thickness in the range of about 10 nm-1000 nm, inclusive.

A VCP according to the present invention optionally includes layers of material in addition to the heterostructure bilayer and substrate. For example, the disclosed VCP optionally includes one or more adhesion/buffer materials. In particular embodiments, only a single layer of an SMA is included in a modular VCP according to the present invention.

In one embodiment, one or more adhesion/buffer layers is included to adhere the heterostructure bilayer to the Si support wafer and to serve as buffer layers, deterring chemical elemental interdiffusion between the heterostructure bilayer and Si support wafer. A buffer/adhesion material is illustratively selected from $SiO_2$; and metals such as Ti, Pt, Cr and Pd.

One or more layers of a buffer-adhesion material are optionally included in a modular VCP according to the present invention. In certain embodiments including an adhesion/buffer material, an adhesion/buffer material is disposed between the heterostructure bilayer and substrate. In particular embodiments, the number of layers of buffer-adhesion material included is in the range of about 1-10, inclusive. In further embodiments, each of the buffer-adhesion layers independently has a thickness in the range of about 1 nm-1000 nm, inclusive, preferably in the range of about 2.5 nm-500 nm, inclusive. For example, in one embodiment, three adhesion/buffer layers are included, a $SiO_2$ layer, a Ti layer and a Pt layer. In a further particular embodiment, the thickness of the $SiO_2$ layer, Ti layer and Pt layer is 400 nm/10 nm/100 nm, respectively. A buffer/adhesion layer is deposited by any of various methods, illustratively including sputtering, for example.

In further particular embodiments, the disclosed VCP damps mechanical vibrations with frequency ranges from 3 kHz to 25 kHz with an elastic dissipation value of at least 0.5.

In a specific embodiment, an inventive VCP includes a thin film layer of NiTi Shape Memory Alloy overlying a piezoelectric $Ba_{1-x}Sr_xTiO_3$ (BST) perovskite oxide thin film layer, such as a $Ba_{0.80}Sr_{0.20}TiO_3$ perovskite oxide thin film layer, situated on a single crystal (100) silicon material substrate support.

VCP In MEMS Device

A modular VCP provided according to the present invention is advantageously employed in a variety of MEMS applications where vibration is problematic to the device/system performance.

A microelectromechanical system includes one or more devices partially or totally manufactured using microfabrication techniques. Microelectromechanical systems include microfabricated devices of any of various types illustratively including accelerometers, temperature sensors, adaptive optics, piezoelectric actuators, chemical sensors, atomic force microscope probes, bio-sample analysis chips and micro lenses.

In a specific example, a modular VCP according to the present invention is provided to reduce unwanted vibrations that cause advanced munitions/projectiles to miss their designated targets. In such systems, in-flight vibration and/or high G-forces can reduce the accuracy of MEMS inertial guidance systems. In particular, MEMS angular rate sensors (ARS) which are critical devices for navigation and guidance control of advanced smart munitions/missile systems are affected by vibration. A modular VCP according to the present invention is advantageously incorporated in a MEMS angular rate sensor for use in navigation and guidance control of advanced smart munitions/missile systems. Angular rate sensor MEMS devices are known in the art, exemplified by ADXRS300 Angular Rate Sensor manufactured by Analog Devices, Norwood, Mass.

Advantages of embodiments of an inventive modular VCP include not only the ability to dampen harsh vibrations associated projectile/munition launch/high-g/in-flight forces but also to satisfy the size, weight, power and cost requirements needed for military guided munitions applications. In particular, a modular VCP according to the present invention is useful in isolating a sensitive device from longitudinal, kinetic energy inherent to a high velocity flight environment.

Figure 2:
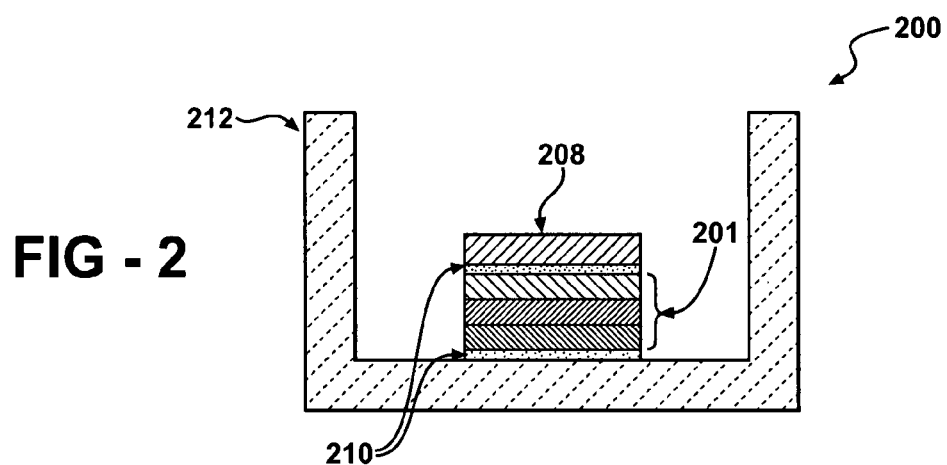
FIG. 2 is a schematic representation of an inventive vibration control pedestal (VCP) integrated with a MEMS die and the base of a device ceramic package in accordance with the an embodiment of the invention.

FIG. 2 displays a schematic of an apparatus 200 including a modular VCP integrated with a MEMS die and base of a device ceramic package. The modular VCP 201 includes a heterostructure composite bilayer having a piezoelectric component and a shape memory alloy component, the piezoelectric component closest to an included substrate compared to the shape memory alloy such that a vibrational wave entering the VCP from the device ceramic package 212 contacts the piezoelectric component of the VCP before encountering the shape memory alloy component. The shape memory alloy is in contact with the piezoelectric component.

In the embodiment shown in FIG. 2, an inventive modular VCP is adhered to or integrated with a MEMS device 208 and device ceramic package 212 via bond layers 210. As shown, a first bond layer 210 is disposed between the MEMS device 208 and the shape memory alloy layer of VCP 201 and a second bond layer 210 is disposed between the device ceramic package 212 and the substrate layer of VCP 201. A piezoelectric material layer is disposed on the substrate layer in contact with the shape memory alloy layer.

A modular VCP is optionally integrated with a MEMS device by contact of the MEMS die and the modular VCP, such as by bonding of the MEMS die and the VCP.

A method of integrating a vibration control pedestal module within a MEMS device package and providing a MEMS device including a modular VCP according to the present invention includes bonding the top of the vibration control pedestal to the MEMS die and bonding the bottom of the vibration control pedestal to the device ceramic package; and then closing/sealing the device ceramic package. The top of a modular VCP is a surface of the SMA component of the heterostructure bilayer. Thus, for example, an SMA layer has a bottom surface and a top surface, and the piezoelectric ceramic layer has a bottom surface and a top surface. A heterostructure bilayer included in an embodiment of a modular VCP is configured such that the bottom surface of the SMA layer is in contact with the top surface of the piezoelectric ceramic layer and such that the top layer of the SMA layer is oriented to be more proximal to the MEMS die than the bottom layer of the SMA layer.

Bonding of a modular VCP to a MEMS die and/or to a device ceramic package may be accomplished using materials and methods which do not significantly interfere with vibration damping properties of an inventive modular VCP. For example, bonding is illustratively accomplished using an adhesive such as a solder material and/or a polymer adhesive. An exemplary solder material is illustratively a metallic solder material, such as PbSn. In addition, a bonding material is illustratively a polymeric adhesive. Suitable polymeric adhesives include isotropic and anisotropic conductive adhesives including organic polymer compounds such as epoxies, optionally together with additives such as fillers, solvents, co-polymers, cross-linkers and the like.

In one embodiment, a modular VCP according to the present invention adds no additional power requirements to the packaged MEMS device since no power source is required for operation of a modular VCP.

Figure 3:
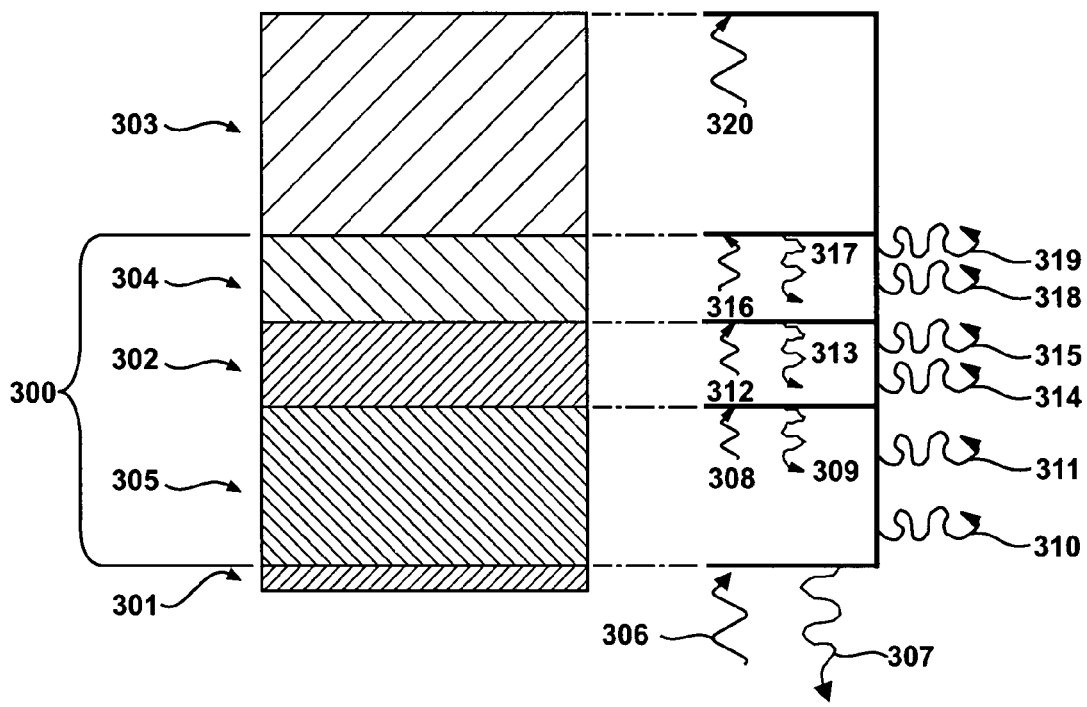
FIG. 3 is a schematic diagram for the generalized solution to the wave equation for this geometry with incident and reflected waves, as well as showing the dispersion due to shear and normal components.

Validation and verification of a modular VCP according to the present is accomplished utilizing a multilayered continuum mechanics approach to model the longitudinal vibration modes as a function of thin film materials included in a modular VCP. In an embodiment graphically represented in FIG. 3 a modular VCP 300 includes a Si substrate 305, piezoelectric thin film 302, and shape memory alloy 304. In FIG. 3, the modular VCP 300 is integrated with the base of the device ceramic package 301 and bottom of the MEMS die 303. An incident compressional energy wave I0-306, enters the bottom of the pedestal 300 from the device ceramic package 301. I0-306 is normalized to be 1. At each interface within the composite, a certain amount of the incident energy—Ij 308, 312, 316, is reflected—Rj 309, 313, 317. Additionally, another packet of energy is viscously damped, and a final amount of incident energy is removed via piezoelectric (shape memory) loss mechanisms. The piezoelectric and viscous effects have a normal and a shear component. The net shear loss, Sj-311, 315, 319 is the sum of all of the viscous and all of the piezoelectric shear components. The net normal losses, Dj-310, 314, 318 is the sum of the viscous and piezoelectric normal components. The incident energy is assumed to be parallel to the normal of the pedestal 300; hence, all shear components are within the plane of the pedestal. The final energy wave of interest, IF-320 is the sum of the incident energy wave, I0-306 and the reflected, shear, and normal losses within each layer. The general equation for the wave incident to each layer, Ij, is given in Equation 1, and the net incident wave is given in Equation 2. When the values of Sj, Rj, and Dj are significantly less than 1, it is assumed that each value can be calculated relative to the incident wave, I0, not the wave incident upon each layer, Ij.

$$I_j = I_{j-1} - R_{j-1} - S_{j-1} - D_{j-1}. \qquad \text{Eq. 1}$$

$$I_j = I_0 - \sum_{j=1}^{j} R_{j-1} + \sum_{j=1}^{j} S_j + \sum_{j=1}^{j} D_j. \qquad \text{Eq. 2}$$

Ij is the incident wave to layer j; Rj is the reflected wave at the interface between layer k and k+1; Sj is the shear dissipation of the wave within layer j; and, Dj is the normal dissipation (damping) of the wave within layer j. The normal dissipation is a sum of the mechanical, the piezoelectric and the shape memory losses incurred during operation in the 33 (normal) direction. The shear dissipation is a sum of the mechanical, the piezoelectric and the shape memory losses incurred during operation in the 31 (shear) directions. A final IF/I0, 320/306, that is 0.5 or less indicates that more than 50% of the incident wave has been damped by the time it reaches the device. The incident wave is assumed to be primarily a compression wave traveling in the 33 direction acting only on the bottom surface of the silicon pedestal 306 with a driving frequency between 3 and 20 kHz.

It is assumed that all of the incident and traveling waves ($\psi$) are of the form Fexp($-i\omega Z$), which will satisfy the general wave equation:

$$c^2 \nabla^2 \psi = \left(\frac{\partial^2 \psi}{\partial t^2}\right). \qquad \text{Eq. 3}$$

for the case of a 1-D wave traveling only in the longitudinal (thickness) direction of the film with minimal interactions in the transverse directions. For a VCP including materials having a thickness that is significantly less than the width, this is a reasonable assumption. From Equation 1, it is possible to solve for the 1-D wave equation as shown in Equation 5a, where the phase velocity is given by $\upsilon$.

$$\nabla^2 \psi - \frac{1}{c^2}\left(\frac{\partial^2 \psi}{\partial t^2}\right) = 0 \qquad \text{Eq. 5a}$$

$$\upsilon = c = \sqrt{\frac{t}{\rho}} \qquad \text{Eq. 5b}$$

A general solution is assumed, where $\omega$ represents the angular frequency:

$$\frac{\partial^2 \psi}{\partial x^2} + \frac{\omega^2}{\upsilon^2}\psi = 0 \qquad \text{Eq. 6}$$

Separating the variables and solving yields Equation 7, where the material wave number is ki, and the individual solution is ψ(x,t), and λ is the wavelength:

$$\Psi(x, t) = \exp\left[-i\left(\frac{\omega}{v}\right)(x - vt)\right]$$ Eq. 7

$$\Psi(x, t) = \exp(i(\omega t - kx))$$

where $k \equiv \frac{\omega^2}{v^2} = \frac{2\pi}{\lambda}$

Equation 7 can be modified to include the effects of damping (−β), as seen in Equation 8:

$$\Psi(x,t) = A\exp(-\beta x)\exp(i(\omega t - kx))$$ Eq. 8

The reflection (R) and transmission (T) coefficients are defined using the material wave numbers (ki):

$$T = 1 - R = \frac{4k_1 k_2}{(k_1 + k_2)^2}$$ Eq. 9

$$R = \left(\frac{k_1 - k_2}{k_1 + k_2}\right)^2$$

FIG. 3 displays a schematic diagram of an exemplary multilayer structure. In the modeling approach an incident compressional wave 306 enters the bottom of the pedestal 300 through the device ceramic package 301, and it is referred to as $I_0$ 306. In this approach, a 1-D wave traveling only in the longitudinal direction of the film with minimal interactions in the transverse directions. This is reasonable since the thin film materials possess a thickness that is significantly less than their width, and it assumes that the shear components do not significantly contribute to the damping. Beginning with the wave equation for a forced oscillator with damping (Equation 3), it is possible to solve for the 1-D wave equation (Equation 8). Once solved, determining the reflection and transmission coefficients is straightforward, and they are shown in Equation 9, where k is a function of the input energy frequency (ω), the materials density (ρ), and modulus (t).

While Equation 8 generates a set of equations describing the behavior of a traveling wave within a material, the critical thickness for damping at these frequencies is far larger than the thicknesses of the materials within the modular VCP heterostructure. This results in a set of equations where only the non-linear components (i.e. active materials; piezoelectric, piezomagnetic, or shape memory) of the damped wave equation remain. Consequently, it is expected that a structure of the size of the modular VCP according to the present invention would demonstrate minimal dispersion, even though the materials do demonstrate hysteretic damping. A single pass through an SMA could be expected to demonstrate a 10% dispersion at best, and values in thin films are thought to be substantially lower than those observed in bulk materials. The large net dispersion anticipated from the VCP heterostructure results from the large impedance mismatch at the interfaces between layers. This effectively forces the traveling wave to traverse the BST and SMA layers, where energy dispersion takes place, numerous times, creating an effective thickness many hundreds of times larger than the physical thickness.

Reflectivity and transmission are calculated at each interface, yielding a composite transmission model relating the input energy, $I_0$ 306 to the energy transmitted to the MEMS die, If 320.

As noted above, a modular VCP according to the present invention optionally includes materials in addition to a heterostructure bilayer and substrate. In an exemplary embodiment an inventive VCP includes a bonding material and adhesion/buffer material. Continuum mechanics is employed to model the longitudinal vibration modes as a function of thin film materials which compose embodiments of the modular VCP, solder-adhesion/buffer layers and the device ceramic package. The VCP-solder/adhesion-ceramic package structure is modeled as a multilayer material with physically distinct, but mathematically continuous, interfaces. Specifically, vibration modeling for a 1-D thin plate composite is developed whereby the modular VCP has a composite bilayer thin film heterostructure, namely a piezoelectric (BST) and a shape memory alloy (NiTi), overlying the buffer-adhesion layers to the Si support wafer. In an example of such an embodiment, shown in FIG. 4A, a Si wafer underlies $SiO_2$, Ti and Pt layers, and the $SiO_2$, Ti, and Pt film layers serve to adhere the base layer active thin film to the Si support wafer and serve as buffer layers, to deter chemical elemental interdiffusion between the active thin film and Si support wafer.

Figure 4A:
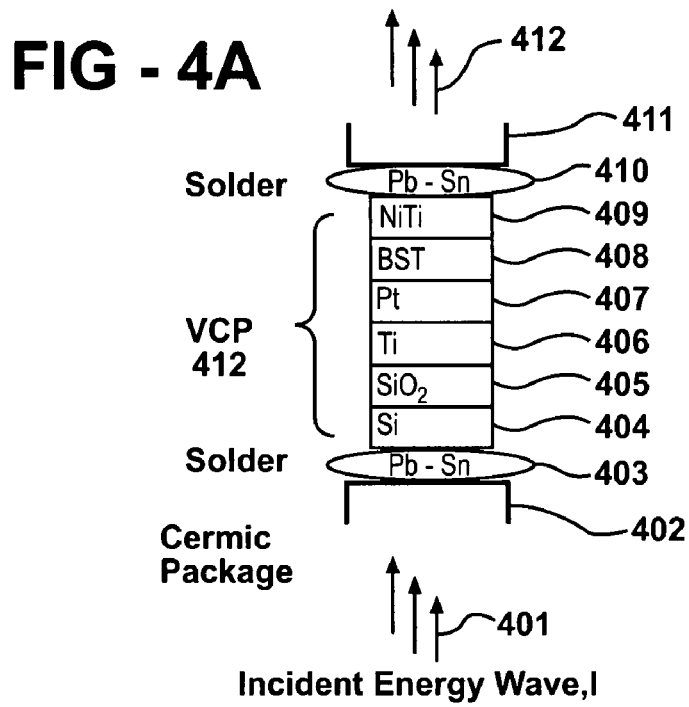
FIG. 4A is a schematic representation of an inventive vibration control pedestal (VCP) integrated with a MEMS die and the base of a device ceramic package in accordance with the an embodiment of the invention.
Figure 4B:
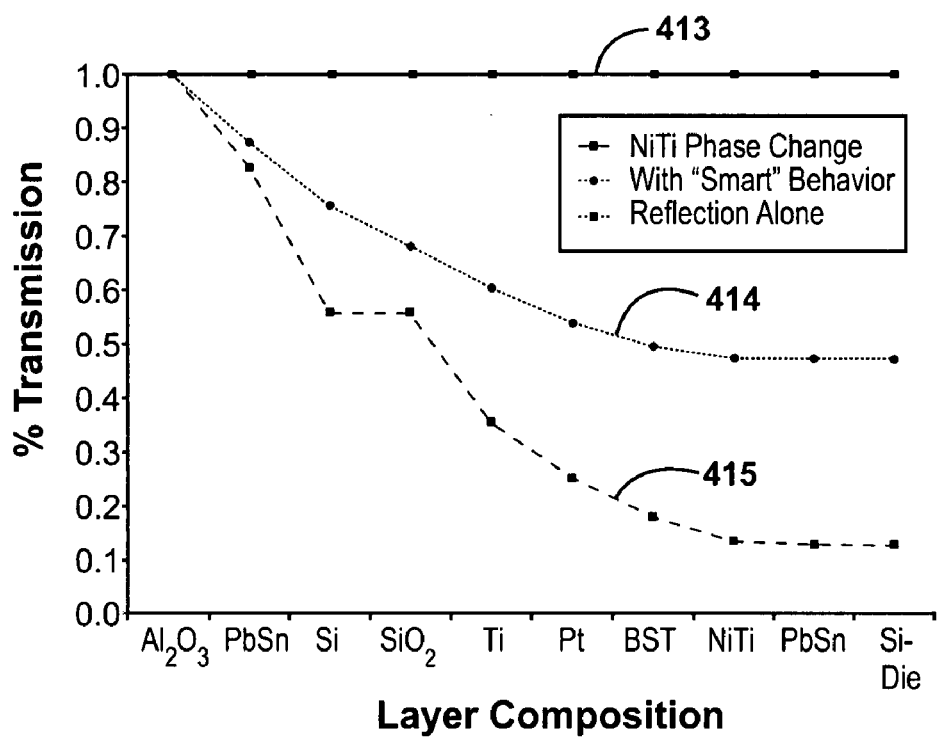
FIG. 4B is a graph showing the effectiveness of a VCP shown in FIG. 4A.
Figure 5:
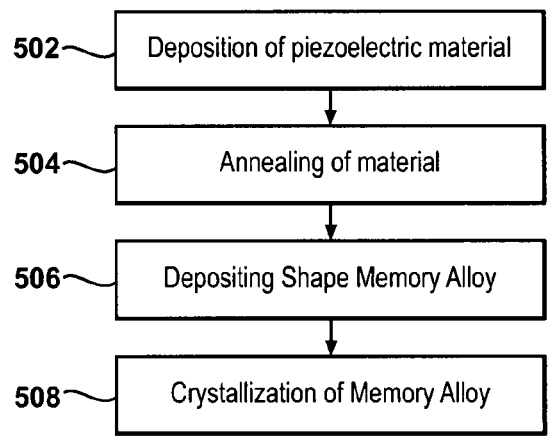
FIG. 5 is a flow diagram illustrating a process for fabricating a VCP according to an embodiment of the present invention.

By examining the transmission of the energy through the composite structure, it is possible to see the effects of each layer. The energy 401 enters the structure, as shown in FIG. 4A, and travels from the $Al_2O_3$ ceramic package 402 to the lead-tin solder bond layer 403 through Si wafer 404, $SiO_2$ 405/Ti 406/Pt 407 buffer/adhesion layers, composite bilayer heterostructure BST 408/NiTi 409 active thin films and lead-tin solder bond layer 410. The energy exiting the surface of the structure 411 is the "final transmitted energy" 412. The ratio of final energy 412 to initial energy 401 is the damping coefficient, or percent transmitted energy, shown on the y-axis of FIG. 4B. The layers that the energy passes through are shown on the x-axis in FIG. 4B. When only the mechanical properties of the modular VCP layers are examined, i.e. reflection and transmission, etc., and the non-linear damping components are neglected, a structure that reduces the energy by less than 0.5% at steady state is yielded. This is shown in FIG. 4B as the "Reflection Alone" 413 trace. When the "strain response" nonlinear components are added for the BST and the NiTi, over 45% of the initial input energy is damped, as shown in FIG. 4B with the "Smart Behavior" 414 trace. This damping can be increased to almost 90%; if the BST and NiTi are deposited in such a way that a partial "phase change" occurs during transmission of the vibrational wave. FIG. 4B reflects this result with the "NiTi Phase Change" 415 trace. For all three of these traces it is assumed that the dispersion only occurs within the NiTi and BST layers. The observed decrease in intensity shown in FIG. 4B for the "NiTi Phase Change" 415 and with "Smart Behavior" 414 traces is due to the decreased intensity of the waves that are reflected back into that layer as shown in FIG. 3. The amount of dispersion can be drastically increased, even for thin films, by joining two materials that have different impedances. Continuum mechanics modeling verifies and validates that utilizing active thin films for the VCP is appropriate for obtaining a minimum of 50% reduction of incident energy.

Method of Fabrication

A method of fabricating a modular VCP is provided according to the present invention which includes depositing a piezoelectric material on a substrate and depositing a shape memory alloy material on the piezoelectric material. In particular embodiments, one or more adhesive/buffer materials is interposed between the substrate and the piezoelectric material.

A method of fabricating a modular VCP is provided according to the present invention which includes depositing a thin film of a piezoelectric perovskite oxide thin film on a substrate and treating the perovskite oxide thin film to induce crystallinity of the perovskite oxide, producing crystalline perovskite oxide. A thin film of shape memory alloy is deposited on the perovskite oxide. The thin film of shape memory alloy is treated to induce crystallinity in the thin film of shape memory alloy, producing crystalline shape memory alloy.

A piezoelectric perovskite oxide material is preferably deposited as a thin film with nominal thickness in the range of about 10 nm-1000 nm, more preferably about 50 nm-500 nm. In a specific example, a piezoelectric perovskite oxide thin film is a $Ba_{1-x}Sr_xTiO_3$ layer having a thickness of about 200 nm.

Modular VCP fabrication includes deposition of a piezoelectric perovskite oxide material by any of various thin film deposition techniques illustratively including metalorganic solution deposition (MOSD), sputtering, metal-organic chemical vapor deposition (MOCVD), molecular beam epitaxy (MBE) and pulsed laser deposition (PLD).

Figure 6:
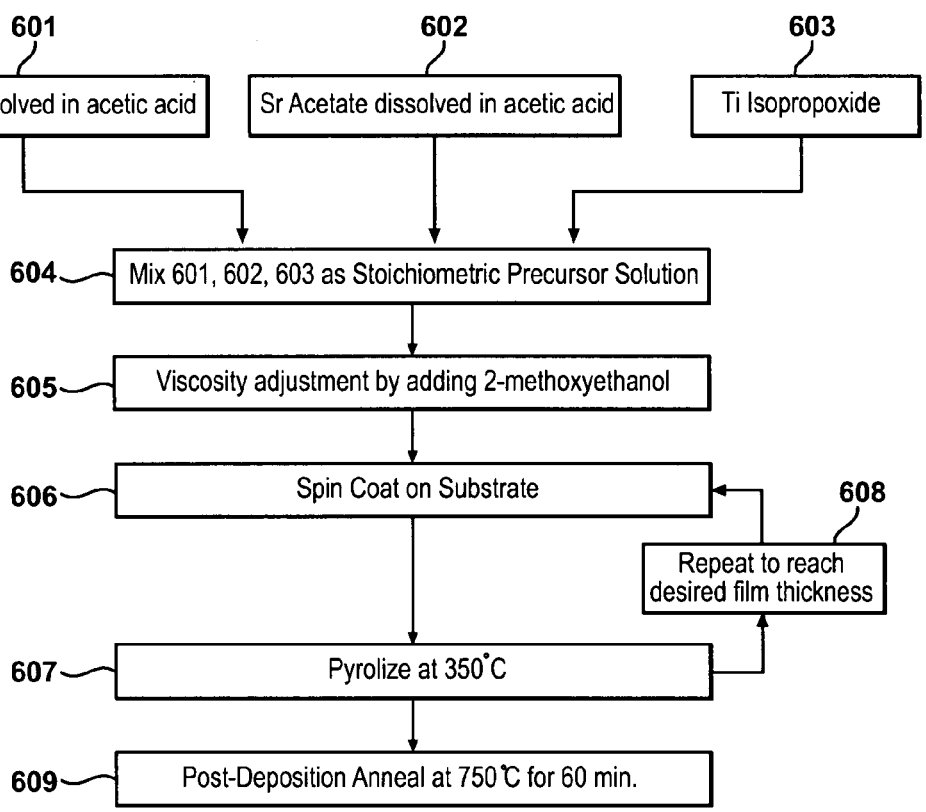
FIG. 6 is a flow diagram illustrating a process for fabricating the piezoelectric perovskite oxide component of a VCP according to an embodiment of the present invention.

In a preferred embodiment, modular VCP fabrication includes BST deposition via MOSD technique, FIG. 6. The MOSD BST thin film fabrication utilizes barium acetate dissolved in acetic acid 601, strontium acetate dissolved in acetic acid 602, and titanium isopropoxide 603 as precursors to form a stoichiometric precursor solution 604 which forms the BST film. Particulates are removed from the solution by filtering through 0.2 μm syringe filters. The viscosity of the precursor solution may be adjusted using 2-methoxyethanol 605. The precursor films are spin coated onto the substrate 606. Subsequent to coating, the films are pyrolyzed at 350° C. for 10 min 607 in order to evaporate solvents and organic addenda and form an inorganic amorphous film. The spin coat pyrolization process is repeated 608 until a nominal film thickness of 200 nm is achieved. Crystallinity is achieved via post-deposition annealing in an oxygen ambience at 750° C. for 60 minutes 609.

A $Ba_{0.80}Sr_{0.20}TiO_3$ (BST) thin film material is grown by the metal organic solution deposition (MOSD) technique using barium acetate, strontium acetate, and titanium isopropoxide as precursors to form BST in a preferred embodiment of a method according to the present invention. Acetic acid and 2-methoxyethanol are used as solvents. A stoichiometric precursor solution is concentration optimized at 0.43 Molar in a particular example. In general, the molarity of the precursor solution is in the range of about 0.3-0.55 Molar in embodiments of MOSD of $Ba_{0.80}Sr_{0.20}TiO_3$. Particulates are removed from the solution by filtering through 0.2 μm syringe filters. The stoichiometric precursor solution is used to spin coat onto the substrate, forming a film. Subsequent to coating, the films are pyrolyzed at 350° C. for 10 min in order to evaporate solvents and organic addenda and form an inorganic amorphous film. The spin coat pyrolization process is repeated until a nominal film thickness of 200 nm is achieved.

Film thickness is measured by any of various techniques, illustratively including Rutherford backscattering spectroscopy (RBS), cross-sectional field emission scanning electron microscopy (FESEM) and cross-sectional transmission electron microscopy (X-TEM).

A $Ba_{0.80}Sr_{0.20}TiO_3$ thin film material is crystallized via post-deposition annealing using a quartz tube furnace in a flowing oxygen ambience at 750° C. for 60 minutes.

A shape memory alloy is deposited on the piezoelectric material. For example, deposition of a shape memory alloy may be accomplished by sputtering. In a specific embodiment, a thin film material of NiTi is deposited. NiTi thin film material is grown by DC magnetron sputtering using a NiTi composite target heated to 700° C. A NiTi film is deposited at a base pressure below $5\times10^{-8}$ Torr, with argon pressure at about $2\times10^{-3}$ Torr. The target to sample distance is maintained at 4 cm and sputtering power is 300 Watts. The deposition rate at these conditions is 0.76 nm/s.

A NiTi thin film material is crystallized via in-situ substrate heating at 500° C. for 10 min. prior to removal from the sputtering system.

In further embodiments, a method for fabricating a modular VCP includes deposition of a buffer-adhesion material on the substrate. A buffer-adhesion material preferably includes layers of $SiO_2$/Ti/Pt wherein the $SiO_2$ layer is positioned adjacent the substrate and the Pt layer is positioned adjacent the piezoelectric material. Each of the buffer-adhesion layers independently has a thickness in the range of about 1 nm-1000 nm, preferably in the range of about 2.5 nm-500 nm. For example, in a preferred embodiment, the $SiO_2$/Ti/Pt layers are of thickness 400 nm/10 nm/100 nm, respectively. A buffer/adhesion layer is deposited by sputtering, for example.

In a preferred embodiment, a substrate used in a method of fabricating a modular VCP is a (100) silicon material. The substrate may have a shape and size desirable for a particular application. In a preferred embodiment, a substrate is a (100) silicon wafer.

A substrate is optionally purified prior to use in fabrication of a modular VCP. For example, in an embodiment in which a silicon substrate is used, the (100) silicon material substrate is optionally purified. An exemplary purification includes dipping the substrate in acetone and methanol, followed by a weak HF solution to remove/etch native oxide, and then rinsing in de-ionized (DI) water.

A method of fabricating a MEMS device including a modular VCP according to the present invention includes bonding the modular VCP to a MEMS device and/or bonding the modular VCP to a MEMS device package. Bonding is by any method suitable for attaching a modular VCP to a MEMS device and/or bonding the modular VCP to a MEMS device package. For example, a modular VCP is illustratively bonded to a MEMS die and/or MEMS device ceramic package via metallic solder, such as PbSn; and/or by polymeric adhesive.

In one embodiment, a heterostructure bilayer is oriented in a MEMS device including a modular VCP such that an SMA material included in the bilayer is more proximal to the MEMS die compared to the piezoelectric material and the piezoelectric material is more proximal to a MEMS device ceramic package compared to the SMA.

An advantage of a method of fabrication according to the present invention is that inventive methods are easily scaled for affordable manufacture via semiconductor standard fabrication tools and process science protocols.

Figure 7A:
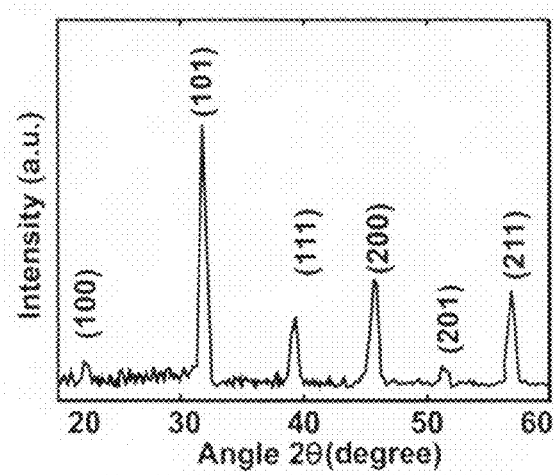
FIG. 7A is an X-ray diffraction pattern of an annealed metalorganic solution deposition (MOSD) fabricated $Ba_{0.80}Sr_{0.20}TiO_3$ (BST) base layer film included in an embodiment of a VCP according to an embodiment of the present invention.
Figure 7B:
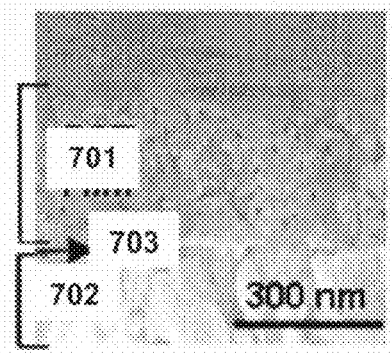
FIG. 7B is a cross-sectional field emission scanning electron microscopy (FESEM) micrograph showing abrupt substrate/BST interface and dense granular BST film microstructure.
Figure 8A:
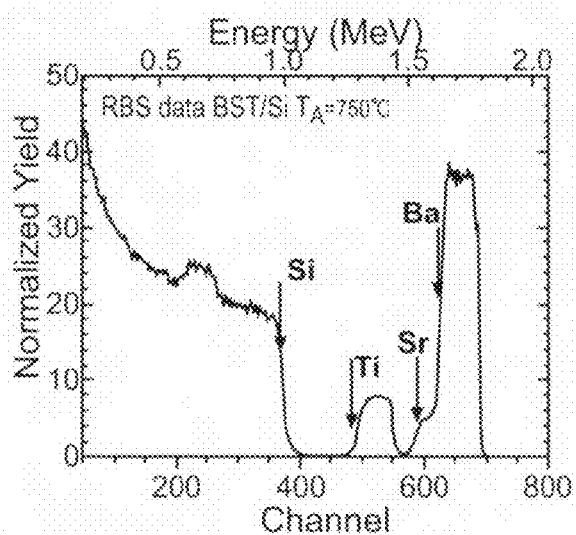
FIG. 8A shows experimental Rutherford backscattering spectroscopy (RBS) results for a 750° C. annealed MOSD fabricated BST.
Figure 8B:
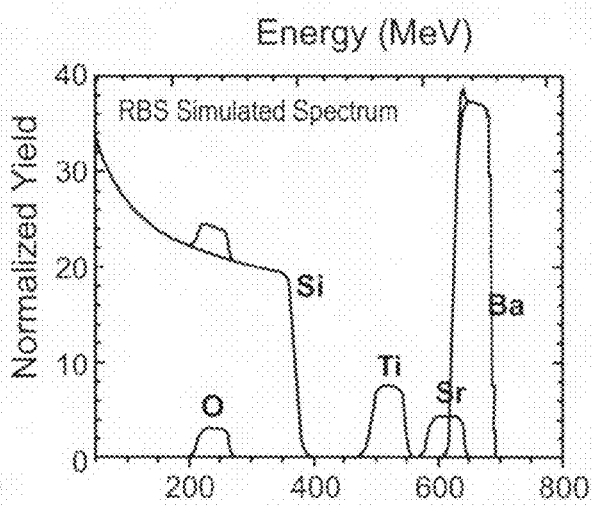
FIG. 8B shows RUMP simulated RBS spectrum for a 750° C. annealed MOSD fabricated BST.

FIG. 7A displays the x-ray diffraction pattern of the 750° C. annealed MOSD BST base layer film. The glancing angle x-ray diffraction results demonstrates that the BST films are tetragonal and possess a well developed non-textured polycrystalline perovskite structure with no evidence of secondary phase formation. The film-substrate interfacial quality, i.e., structure and composition, strongly influences the integration integrity of the composite heterostructure. The cross-sectional field emission scanning electron microcopy (FESEM) image of the BST film, FIG. 7B, reveals a structurally well-delineated interface 703 between the BST film 701 and substrate 702. This data substantiates the fact that the film and silicon substrate maintain chemical and thermal stability at processing temperatures up to 750° C., the annealing temperature. The Rutherford backscattering spectroscopy (RBS) analysis, FIGS. 8A and 8B, confirms the compositional integrity of the annealed BST film. Specifically, composition, thickness, and interface quality of the base layer BST film was determined by comparing the experimental data to a simulation generated by the RUMP RBS analysis package. The simulated spectrum was derived for an idealized Si substrate/BST heterostructure with no occurrence of elemental interdiffusion within the structure. FIGS. 8A and 8B display the RBS spectra for both the experimental data, FIG. 8A and RUMP simulation, FIG. 8B. A quantitative comparison of the experimental data with the simulated RBS results reveals no measurable deviation in peak shape and position between the two spectra. From the experimental RBS data in FIG. 8A it is observed that the low energy (back edges) edges of the Ba, Sr, and Ti, peaks (from the BST film), and the high energy (front edge) edge of the Si signal from the substrate are sharp/abrupt. The fact that the experimental data is virtually identical to that of the simulation, combined with the peak edge sharpness, indicates that there is negligible interdiffusion between the annealed BST film and the underlying Si substrate. The RBS analyses confirmed the BST active thin film to be stoichiometric, i.e. the Ba:Sr ratio is 78:22. The film thickness of the BST layers is ~200 nm, which is in agreement with the cross-sectional FESEM studies.

Figure 9A:
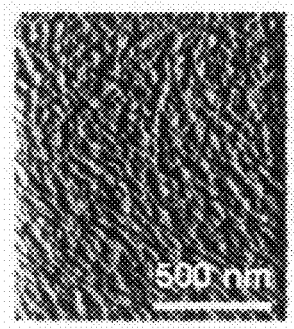
FIG. 9A is a plan-view atomic force microscopy (AFM) micrograph showing the surface morphology of a 750° C. annealed base layer BST thin film included in an embodiment of a VCP according to the present invention.
Figure 9B:
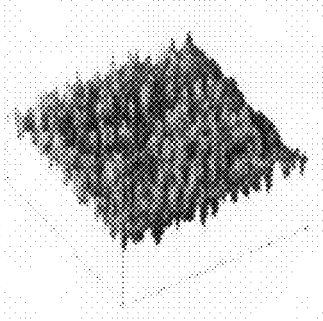
FIG. 9B is a 3-D AFM micrograph showing the surface morphology of a 750° C. annealed base layer BST thin film included in an embodiment of a VCP according to the present invention.
Figure 9C:
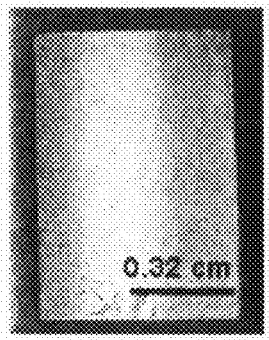
FIG. 9C is an optical plan-view micrograph showing the top surface of the heterostructure bilayer included in an embodiment of a VCP, i.e. after sputter deposition of a NiTi layer over a base layer BST thin film according to the present invention.

The film surface quality strongly influences the integration integrity of the composite bilayer structure. The AFM images of the BST films are represented in FIGS. 9A and 9B. Quantitative analysis of the annealed BST film surface, via tapping mode AFM, determined the average surface roughness, $R_a$, to be less than 2 nm. FIG. 9C is an optical micrograph of the top surface of the bilayer heterostructure, i.e. after sputter deposition of the NiTi over-layer. FIG. 9C demonstrates that this top surface is continuous, smooth, crack free, and uniform. AFM analysis determined the average roughness to be, $R_a$~2.2 nm, thereby judging this upper surface as suitable for integration with the MEMS die. A smooth, substantially defect-free surface is preferable on which to deposit/grow the overlying NiTi film. Surface roughness less than 5 nm promotes reliable integration.

Figure 10A:
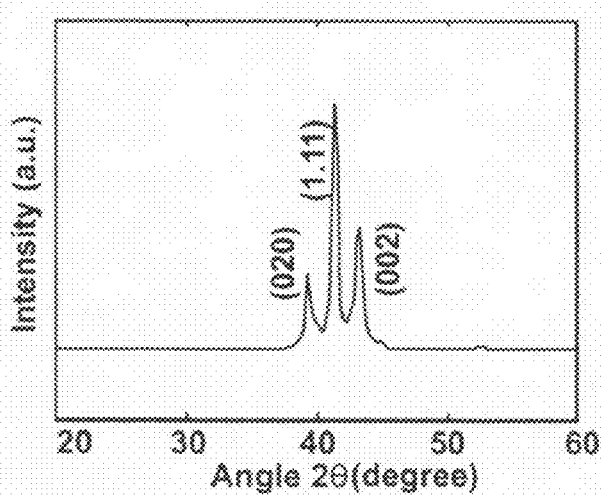
FIG. 10A shows glancing angle x-ray data of an annealed sputter deposited NiTi thin film included in an embodiment of a VCP according to the present invention.
Figure 10B:
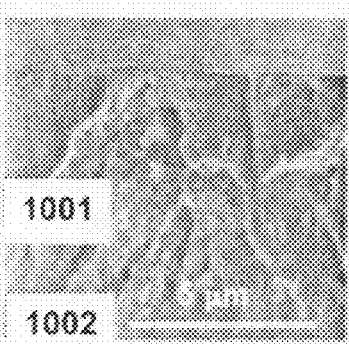
FIG. 10B shows an FESEM cross sectional micrograph of a NiTi film included in an embodiment of a VCP according to the present invention.

Subsequent to the crystallization of the BST film the NiTi film was deposited via ultra high vacuum (UHV) DC magnetron sputtering. A Residual Gas Analyzer (RGA) is used to monitor contamination levels, particularly water and carbon dioxide pressure, prior to sputtering. An argon scrubber was used to further clean the 99.999% purity argon gas used for the sputtering process. The temperature of the NiTi composite target during sputtering is ramped to 700° C. The NiTi films are deposited at a base pressure below $5 \times 10^{-8}$ Torr, while argon pressure during sputtering is kept at $2 \times 10^{-3}$ Torr. The target to sample distance is maintained at 4 cm and sputtering power is 300 Watts. The deposition rate at these conditions is approximately 0.76 nm/s. After deposition, the NiTi thin films were crystallized via the in situ heater with rotation capability at 500° C. for 10 min. prior to removal from the sputtering system. Glancing angle X-ray diffraction (GAXRD) analysis in FIG. 10A confirms that the NiTi film is well crystallized in the martensitic phase at this annealing temperature. Besides the ability to generate the appropriate crystalline phases of the constituent material, it is also necessary that the interfaces between the constituent films, i.e., NiTi (1001) with the underlying BST film (1002) be physically and chemically discrete, i.e., abrupt/smooth, and defect free. FIG. 10B demonstrates that the NiTi film is uniform, dense, and possesses a sharp, structurally distinct interface with the underlying material. RBS results demonstrated that the NiTi thin film remained stoichiometric (49:51) subsequent to film crystallization at 500° C. Thus, no evidence of elemental interdiffusion between the underlying layer and active NiTi thin film layer is observed.

By employing the aforementioned embodiments of a modular VCP and fabrication methods therefore, vibration mitigation is accomplished as a modular component at the MEMS scale and the fabrication and processing protocols are foundry friendly, promote affordability of the VCP and ensure technology transition to commercialization.

Advantages associated with embodiments of the present design and fabrication method include not only the ability to produce a modular damping treatment for a wide range of system/die level components, but one which satisfies the device scale damping criteria, namely light-weight, small size, with minimal added volume to the packaged device. In addition, a modular VCP and methods of fabrication thereof according to the present invention promotes a cost effective solution for vibration damping without added power or complex circuitry.

Any patents, patent applications or publications mentioned in this specification are herein incorporated by reference to the same extent as if each individual publication was specifically and individually indicated to be incorporated by reference.

Systems, apparatus, compositions and methods are described herein to illustrate the invention. It is, therefore, to be understood that the terminology used is intended to be in the nature of words of description rather than of limitation. As will be clear to those of skill in the art, the various aspects of the present invention may be altered or combined in various ways other than those illustrated or discussed, without departing from the scope or teachings of the present invention. It should be understood that the illustrated embodiments are provided for descriptive purposes, and many variations are possible. Such changes and other uses can be made without departing from the scope of the invention as set forth in the claims.

The invention claimed is:

1. A modular vibration control pedestal, comprising:
   a piezoelectric perovskite oxide disposed on a substrate; and
   a shape memory alloy component component disposed on the piezoelectric perovskite oxide.

2. The modular vibration control pedestal of claim 1 wherein the shape memory alloy component is in the form of a thin film having a thickness in the range of about 10 nm-100 microns, inclusive.

3. The modular vibration control pedestal of claim 1, wherein the piezoelectric perovskite oxide is in the form of a thin film having a thickness in the range of about 10 nm-1000 nm, inclusive.

4. The modular vibration control pedestal of claim 1, wherein both the shape memory alloy component and the piezoelectric perovskite oxide component have a longest dimension generally parallel to the substrate and a thickness generally perpendicular to the substrates the longest dimension greater than the thickness.

5. The modular vibration control pedestal of claim 1 integrated with a MEMS device.

6. The modular vibration control pedestal of claim 1, wherein vibration passing through the substrate, the piezoelectric perovskite oxide and the shape memory alloy is reduced by about 50-100%.

7. The modular vibration control pedestal of claim 5, wherein the MEMS device is an angular rate sensor.

8. The modular vibration control pedestal of claim 1, wherein the vibration control pedestal is effective to damp mechanical vibrations having frequencies in the range of about 3 kHz to about 25 kHz with an elastic dissipation value of at least 0.5.

9. The modular vibration control pedestal of claim 1, further comprising an adhesion/buffer component disposed between the substrate and the piezoelectric perovskite oxide component.

10. The modular vibration control pedestal of claim 1, wherein the substrate comprises a silicon (100) material.

11. The modular vibration control pedestal of claim 1, wherein the shape memory alloy comprises a nickel-titanium alloy.

12. The modular vibration control pedestal of claim 1, wherein the piezoelectric perovskite oxide comprises $Ba_{1-x}Sr_xTiO_3$.

13. A method of fabricating a vibration control pedestal module, comprising:
   depositing a piezoelectric perovskite oxide on a substrate;
   crystallizing the perovskite oxide;
   depositing a shape memory alloy on the piezoelectric perovskite oxide; and
   crystallizing the shape memory alloy, thereby fabricating the vibration control pedestal module.

14. The method of claim 13, further comprising depositing an adhesion/buffer component on the substrate.

15. The method of claim 13, further comprising purifying the substrate.

16. The method of claim 13 wherein the crystallizing the piezoelectric perovskite oxide and/or the crystallizing the shape memory alloy comprises thermal treatment of the piezoelectric perovskite oxide and/or the crystallizing the shape memory alloy.

17. The method of claim 13 wherein the depositing a piezoelectric perovskite oxide comprises metallorganic solution deposition.

18. The method of claim 13 wherein the depositing of a shape memory alloy comprises DC magnetron sputtering.

19. A method according to claim 13, wherein the shape memory alloy material comprises NiTi.

20. A method according to claim 13, wherein the piezoelectric perovskite oxide comprises $Ba_{1-x}Sr_xTiO_3$.

* * * * *